Sept. 14, 1965 J. STERN 3,205,597

INDEX TABS FOR FILING SYSTEMS

Filed Feb. 15, 1963

INVENTOR.

JOACHIM STERN

BY Albert C. Johnston

ATTORNEY 3,205,597
Patented Sept. 14, 1965

3,205,597

INDEX TABS FOR FILING SYSTEMS

Joachim Stern, Menden, Westphalia, Germany, assignor to Hunke & Jochheim, Iserlohn, Westphalia, Germany Filed Feb. 15, 1963, Ser. No. 258,805
Claims priority, application Germany, Feb. 16, 1962, H 44,888
3 Claims. (Cl. 40—23)

The present invention is concerned with an index tab having a transparent cover, such as is used in filing systems. It may be as a guide or rider tab on cards, folders, files, dossiers or the like.

Several types of such index tabs are known. In most types, a folded transparent cover serves as an insertion sleeve for an inscription strip. According to more recent disclosures, the inscription strip is combined with one limb of the folded cover from the outset, by adhesion. This has the advantage that the cover and the inscription strip can be simultaneously cut to the correct length. It is, however, disadvantageous that such index tabs can be lettered on one side only and that this can be done only with difficulty; moreover, in practice, it is often necessary that the inscription strip should be legible on both sides. Furthermore, when the tab is used as a guide tab and is liable to be subjected to physical stress, the rigidity and strength of the projecting head portion are, with these designs, inadequate.

It is an object of the invention to obviate these disadvantages.

According to the invention, a supporting panel for an inscription strip is secured on one of the lower edges of a folded transparent cover portion in such manner that the said panel is within the cover when the cover is folded and can be enclosed thereby. The free head edge of the said panel serves as a support for a folded inscription strip which, either before or after the tab is adhesively secured to the card or the like, can be inserted within the cover and pushed over the support. Due to this arrangement, the tab becomes extremely rigid and the inscription strip can nevertheless easily be lettered on a machine.

In one embodiment of the invention, the supporting panel and the limb positioned opposite it of the cover which encloses it are provided on their lower edge with adhesive coatings or strips which adhere on both sides and which remain covered by a protective foil until the tab is put into use.

In order that the inscription strip may be held securely, it is advantageous to make this strip and the supporting panel sufficiently large to completely fill the cover so as to ensure that when the cover is folded and secured to the index card it will urge the strip against the free edge of the panel. Furthermore, the supporting panel can be in bent over or curved form so as to provide an advantageous angle of view of the tab. Due to this feature, the inserted inscription strip is at the same time retained more effectively.

In order to achieve an additional optical distinguishing effect, the transparent material used for the cover can be of a different colour or it is possible to use inscription strips of differing colours.

The index tab according to the invention can be used both as a visible tab projecting over the marginal edge of the index article by the amount of the width of the inscription strip, and as a rider tab the head edge of which directly surrounds the marginal edge of the index article.

The supporting panel may be of any suitable rigid or semi-rigid material such as cardboard or metal or so-called plastics material.

An embodiment of the index tab according to the invention is shown by way of example in the accompanying drawing, in which:

FIG. 1 is a fragmentary perspective view of the index tab as it appears in the course of being attached to an index card or the like;

FIG. 2 is a similar view thereof as it appears when fully attached;

FIG. 3 is an enlarged transverse cross section through the index tab in an unfolded condition, as it may appear before being assembled with the inscription strip; and FIG. 4 is an enlarged transverse cross section through the attached index tab, as if viewed along the line 4—4 of FIG. 2.

Figures 1, 2, 3, 4:
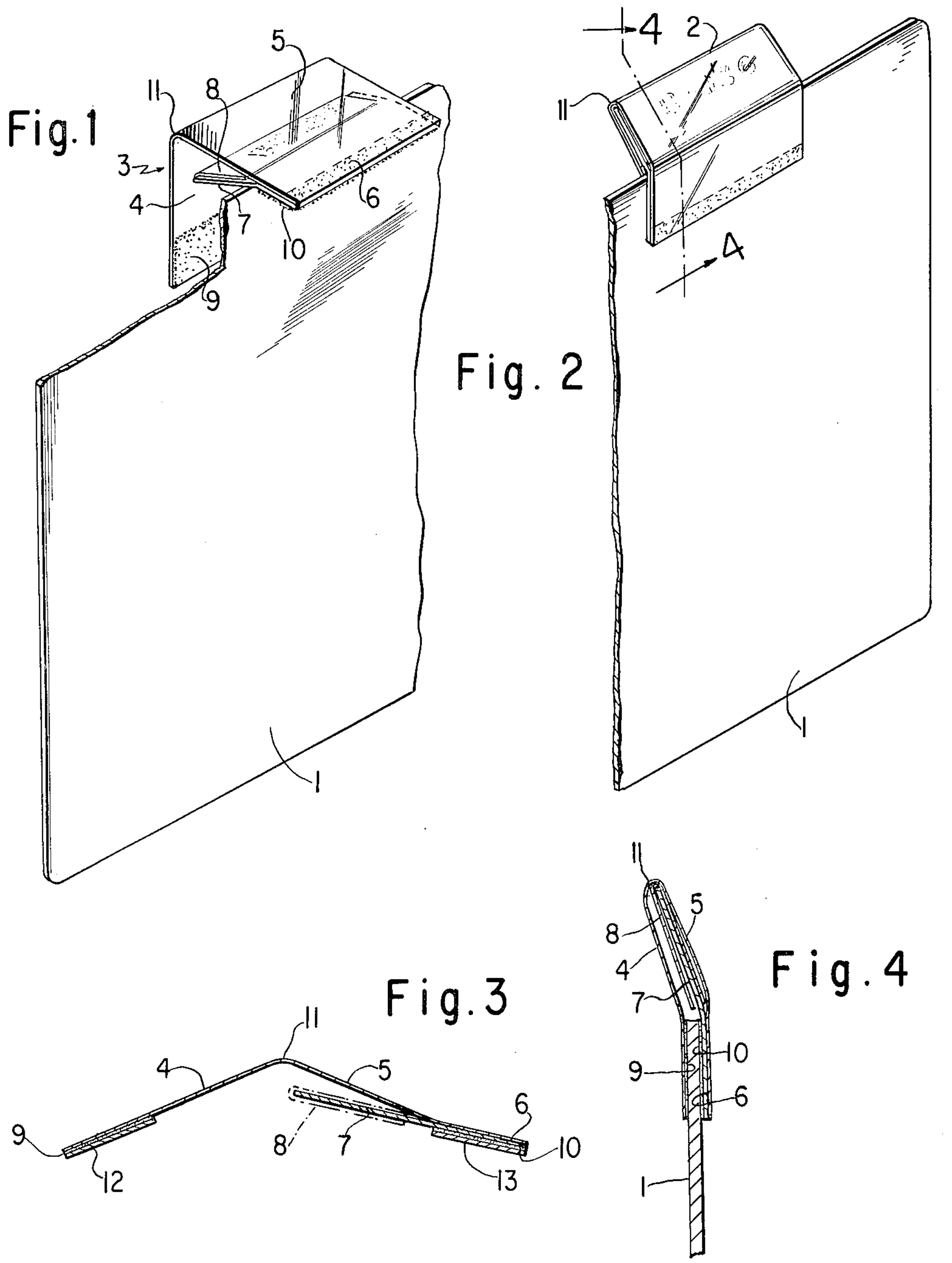

Reference numeral 1 designates an index card carrying an index tab 2. In FIGURES 1, 3 and 4 of the drawing, details of the structure of the index tab are shown. In this case, 3 designates the transparent cover, having two limbs or flaps 4 and 5. Secured on the inner, lower edge 6 of the inside of the limb 5 is one edge of a support panel 7 the opposite free head edge of which is embraced by a folded inscription strip 8.

For securing the index tab to an index card 1 or similar sheet-like article, the lower inner edge portions of the limb 4 and of the panel 7 carry self-sticking coatings or adhesive strips 9 and 10 which before the use of the index tab are kept covered as by detachable foils 12 and 13 as shown in FIG. 3.

When the tab is to be applied in position the inscription strip 8 in doubled form is pushed over the free edge of panel 7, and after removal of the foils covering the adhesive surfaces the tab is secured to the card with apex or fold 11 of the cover urging the inscription strip against the free edge of the supporting panel 7. As seen in FIG. 2, the upper portion of the applied tab, containing the folded strip 8 on the upper portion of panel 7, may be bent backward at an angle to the face of the card about a line extending substantially parallel to the fold 11 between the upper and lower portions of the panel. This bending may be effected by first attaching the limb 5 to the card by the adhesive coating 10 and then attaching the limb 4 to the card under tension so that a pull bending the upper portion of the panel 7 over the edge of the card is exerted through the limb 4 and fold 11 against the strip 8 and the free upper edge of the panel.

The inscription strips themselves are expediently formed in groups by the use of suitable sheet material sub-divided, for example by perforations, into a plurality of juxtaposed sections, so that the individual sections can easily be severed one from the other. Such groups of strips can be lettered on a machine in an especially simple and time-saving manner.

I claim:

1. An index tab for use in filing systems, comprising a cover member of transparent sheet material folded upon itself to form two limbs extending oppositely from the fold thereof, a panel member fixed along its lower edge portion to and along a lower edge portion of the inner side of one of said limbs and lying adjacent to said one limb with its upper edge portion free of said limbs and extending along and terminating near to said fold to support a doubled inscription strip fitted thereover between the upper portions of said limbs, a card-like support, and oppositely facing adhesive coatings on and along lower portions of the inner sides, respectively of said panel member and the other of said limbs and adhering said lower portions to opposite faces of said support along an edge of said support, said other limb extending under tension from said fold to said support with the inside of said cover member at said fold urging the fold of said inscription strip against the free upper edge of said panel member, whereby the inscription strip is held securely in place.

2. An index tab for use in filing systems, comprising a cover member of transparent sheet material folded upon itself to form two limbs extending oppositely from the fold thereof, a panel member fixed along its lower edge portion to and along a lower edge portion of the inner side of one of said limbs and lying adjacent to said one limb with its upper edge portion free of said limbs and extending along and terminating near to said fold to support a doubled inscription strip fitted thereover between the upper portions of said limbs, a card-like support, and oppositely facing adhesive coatings on and along lower portions of the inner sides, respectively, of said panel member and the other of said limbs and adhering said lower portions to opposite faces of said support along an edge of said support, said panel member being formed of a sheet material stiffer than the sheet material forming said cover member, said other limb extending under tension from said fold to said support with the inside of said cover member at said fold urging the fold of said inscription strip against the free upper edge of said panel member, whereby the inscription strip is held securely in place.

3. An index tab for use in filing systems, comprising a cover member of transparent plastic sheet material folded upon itself to form two limbs extending oppositely from the fold thereof, a panel member fixed along its lower edge portion to and along a lower portion of the inner side of one of said limbs and lying adjacent to said one limb with its upper edge portion free of said limbs and extending along and terminating near to said fold to support a doubled inscription strip fitted thereover between the upper portions of said limbs, a card-like support, and oppositely facing adhesive coatings on and along lower portions of the inner sides, respectively, of said panel member and the other of said limbs and adhering said lower portions to opposite faces of said support along an edge of said support with the upper portion of the tab, including said upper edge portion of the panel member and an inscription strip thereon, protruding beyond said edge, said panel member being stiffer than said plastic sheet material yet being bendable about a line intermediate its said upper and lower edge portions by a pull exerted upon its upper edge through said other limb and said fold, said other limb extending under tension from said fold to said support with the inside of said cover member at said fold urging the fold of said inscription strip against the free upper edge of said panel member and holding said upper portion of said panel member bent to an angle over said edge of said support, whereby said strip is held securely in place and at an advantageous viewing angle.

References Cited by the Examiner

UNITED STATES PATENTS

| | | | |
|---|---|---|---|
| 1,416,529 | 5/22 | Turner | 40—23 |
| 1,475,165 | 11/23 | Barker | 40—23 |
| 1,983,878 | 12/34 | Rand | 40—23 |
| 2,649,796 | 8/53 | Zalkind | 40—23 |

FOREIGN PATENTS

| | | |
|---|---|---|
| 136,206 | 1/30 | Switzerland. |

EUGENE R. CAPOZIO, *Primary Examiner.*

JEROME SCHNALL, *Examiner.*